United States Patent [19]

Sloan et al.

[11] Patent Number: 5,399,603
[45] Date of Patent: Mar. 21, 1995

[54] RADON BARRIER FILM FORMING COMPOSITIONS

[75] Inventors: Cephas H. Sloan, Kingsport; Robin L. Minga, Blountville; T. Hugh Williams, Fallbranch, all of Tenn.

[73] Assignee: Eastman Chemical Company, Kingsport, Tenn.

[21] Appl. No.: 55,458

[22] Filed: May 3, 1993

[51] Int. Cl.$^6$ .............................. C08F 20/04
[52] U.S. Cl. ...................... 524/312; 524/451; 524/424; 524/437; 325/437; 325/445; 325/451; 427/421; 427/388.4
[58] Field of Search ........ 525/437, 445, 451; 427/421, 388.4; 524/451, 424, 437, 312

[56] References Cited

U.S. PATENT DOCUMENTS

| | | | |
|---|---|---|---|
| 4,151,148 | 4/1979 | Chosin et al. | 260/29.6 |
| 4,480,085 | 10/1984 | Larson | 528/295 |
| 4,975,762 | 12/1990 | Stradley et al. | 357/74 |

*Primary Examiner*—James J. Seidleck
*Assistant Examiner*—Mary Critharis
*Attorney, Agent, or Firm*—John D. Thallemer

[57] ABSTRACT

This invention relates to a method for rendering a surface substantially impervious to alpha particle radiation such as that produced through radon decay. More particularly, the present invention involves applying to said surface an emulsion containing a sulfopolyester and a copolymer of vinyl acetate and dialkyl maleate, and a plasticizer. The sulfopolyester-acrylic copolymer blend produces a stable alpha particle radiation barrier on sand, rocks and soil.

18 Claims, No Drawings

RADON BARRIER FILM FORMING COMPOSITIONS

FIELD OF THE INVENTION

This invention relates to a method for rendering a surface substantially impervious to alpha particle radiation such as that produced through radon decay. More particularly, the present invention involves applying to said surface an emulsion containing a sulfopolyester and a copolymer of vinyl acetate and dialkyl maleate, and a plasticizer. The sulfopolyester-acrylic copolymer blend produces a stable alpha particle radiation barrier on sand, rocks and soil.

BACKGROUND OF THE INVENTION

Radon-222 has been identified as a pervasive pollutant in indoor air. Radon is now known to be responsible for the majority (55%) of the ionizing radiation dose which individuals receive from both natural and manmade sources and it has been amply demonstrated that exposure to elevated levels of radon gas in household air is associated with increased incidence of lung cancer. Radon rises to the surface through cracks in the dirt and is drawn into homes and other buildings by a slight negative pressure. Negative pressures in the home or buildings are created by changes in the weather and from appliances that pump air from inside the building to the outside. Fireplaces, furnaces and other combustion devices that consume indoor air also create a negative pressure. In addition, today's weather tight buildings tend to retain radon and other air pollutants after they enter the buildings.

Radon (Rn) is a naturally occurring element that is formed upon the radioactive decay of radium-226. Radon is tasteless, odorless and colorless. It exists as a gas in the form of three natural isotopes—Rn-219, Rn-220, and Rn--222. The former two isotopes have half-lives of the order of seconds and thus are of little concern. However, Rn-222 decays in a slower process that is characterized by a considerably longer half-life of 3.82 days. Radon decay proceeds with emission of alpha particle radiation through a series of solid, short-lived radioisotopes (e.g., polonium-218 and polonium-214) that are collectively referred to as radon "daughters" or progeny.

These radon daughters, which are unstable isotopes in their own right, are responsible for most of the radiation dose associated with high radon levels in air. Most radon gas that is inhaled is generally exhaled as well since its radioactive half-life is long as compared to the residence time of the gas in the lungs. However, the above-mentioned alpha-emitting polonium isotopes are solids rather than gases, and a fraction of these radon daughters are deposited on the surfaces of the airways deep in the lung when air is inhaled. The radon progeny deposited in this manner subsequently decay by emission of short-range but slow-moving and powerful alpha particles capable of damaging cells which they encounter. This alpha radiation dose is efficiently delivered to the cancer-generating stem cells present in the epithelium that comprises the surface of the air passages in the lungs.

Early EPA estimates indicated that in the United States alone 5,000 to 20,000 lung cancer deaths a year are attributable to "natural" radon from all sources, and more recent estimates tend to be larger, e.g., between 10,000 and 40,000 lung-cancer deaths each year. Extensive surveys of radon levels in homes and schools are under way at EPA's urging, based on its finding that some 10% of the nation's homes exceed its 4 picoCuries per liter (pCi/L) action level. Congress has recently identified a long-term goal of reducing indoor radon concentrations to typical levels in the outside environment (0.1–0.7 pCi/L), and EPA is publicizing Rn mitigation measures and establishing the groundwork for eventual regulations dealing with allowable levels of radon in indoor air and drinking water.

The radon that ultimately enters buildings emanates from three potential sources: (i) diffusion from soil gas; (ii) release from radon-laden groundwater; and/or (iii) release from radium-containing construction material. The invention disclosed herein addresses the contribution to indoor air pollution from soilborne radon.

Attempts to prevent the entry of radon into a building include the use of plastic sheeting over the soil. Plastic sheeting, however, usually cannot be completely sealed to prevent radon gas from escaping into the indoor air. Polymeric materials have also been used to prevent the entry of radon into a building such as polyamide epoxy compounds, acrylic-based elastomers and isoprene rubber emulsions to seal entry points and cracks. Such materials, however, release volatile organic compounds, are unstable and degrade rapidly.

The present inventors have unexpectedly discovered that an emulsion containing a sulfopolyester and a copolymer of vinyl acetate and dialkyl maleate, and a plasticizer produces a stable, environmentally safe, alpha particle radiation barrier on sand, rocks and soil. The film formed by such emulsion has been shown to reduce alpha particle radiation by 100%. Furthermore, the film does not exhibit any sign of degrading.

SUMMARY OF THE INVENTION

Accordingly, it is one object of the present invention to provide a method for rendering a surface substantially impervious to alpha particle radiation.

Another object of this invention is to provide a stable emulsion for rendering a surface substantially impervious to alpha particle radiation.

These and other objects are accomplished herein by a method for rendering a surface substantially impervious to alpha particle radiation comprising applying to said surface a sulfopolyester-acrylic copolymer blend comprising:

(1) a sulfopolyester consisting essentially of repeat units from
   (a) a dicarboxylic acid selected from the group consisting of aromatic dicarboxylic acids, saturated aliphatic dicarboxylic acids, cycloaliphatic dicarboxylic acids, and combinations thereof;
   (b) a diol; and
   (c) a difunctional sulfomonomer containing at least one sulfonate group attached to an aromatic nucleus wherein the functional groups are hydroxy, carboxy or amino, provided the difunctional sulfomonomer is present in an amount from 12 to 25 mole percent based on 100 mole percent dicarboxylic acid and 100 mole percent diol; and (2) an acrylic copolymer having repeat units from 50 to 90 weight percent vinyl acetate and 10 to 50 weight percent of a dialkyl maleate having the formula

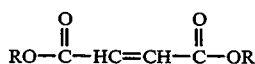

which is polymerized in an aqueous dispersion of the sulfopolyester; wherein R is independently a monovalent alkyl radical having 1 to 12 carbon atoms; and (3) 0.5 to 5.0 weight percent of a plasticizer of the formula:

$$HOCH_2R^1 \quad (I)$$

or

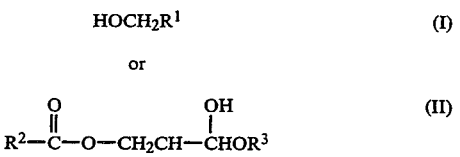

wherein $R^1$ is selected from the group consisting of $CH_2CH_2OH$, $CH(OH)CH_3$, and $CH(OH)CH_2OH$; $R^2$ is selected from the group consisting of hydrogen, an alkyl radical having 1 to 6 carbon atoms, an alkoxy radical having 1 to 6 carbon atoms, a cycloalkoxy radical having 3 to 6 carbon atoms and an aryl radical having 6 to 14 carbon atoms; and $R^3$ is selected from the group consisting of hydrogen and

DESCRIPTION OF THE INVENTION

The sulfopolyester, component (1), contains repeat units from a dicarboxylic acid, a diol and a difunctional sulfomonomer. The sulfopolyester which is utilized as a phosphate flotation additive in the practice of this invention is a water-dispersible or water-dissipatable, linear polyester having a Tg value of 25° C. to 60° C. The term "water-dispersible" is used interchangeably with other descriptors such as "water-dissipatable" or "water-dispellable". All of these terms refer to the activity of water or a mixture of water with a water-miscible organic solvent on the sulfopolyesters described herein. This terminology includes conditions where the sulfopolyester is dissolved to form a true solution or is dispersed within an aqueous medium. Due to the statistical nature of polyester compositions, it is possible to have soluble and dispersible fractions when a single polyester is acted upon by an aqueous medium.

The sulfopolyester contains repeat units from a dicarboxylic acid and a difunctional sulfomonomer, and a diol. Dicarboxylic acids useful in the present invention include aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms. Specific examples of dicarboxylic acids are: terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. The sulfopolyesters may be prepared from two or more of the above dicarboxylic acids.

It should be understood that use of the corresponding acid anhydrides, esters, and acid chlorides of these acids is included in the term "dicarboxylic acid".

The difunctional sulfomonomer component of the polyester may be a dicarboxylic acid or an ester thereof containing a metal sulfonate group ($-SO_3^-$), a diol containing a metal sulfonate group, or a hydroxy acid containing a metal sulfonate group. Suitable metal cations of the sulfonate salt may be $Na^+$, $Li^+$, $K^+$, $Mg^{++}$, $Ca^{++}$, $Ni^{++}$, $Fe^{++}$, $Fe^{+++}$, $Zn^{++}$ and substituted ammonium. The term "substituted ammonium" refers to ammonium substituted with an alkyl or hydroxy alkyl radical having 1 to 4 carbon atoms. It is within the scope of this invention that the sulfonate salt is non-metallic and can be a nitrogenous base as described in U.S. Pat. No. 4,304,901 which is incorporated herein by reference.

The choice of cation will influence the water-dispersibility of the resulting sulfopolyester. Monovalent alkali metal ions yield polyesters that are less readily dissipated by cold water and more readily dissipated by hot water, while divalent and trivalent metal ions result in sulfopolyesters that are not ordinarily easily dissipated by cold water but are more readily dispersed in hot water. Depending on the end use of the polymer, either of the different sets of properties may be desirable. It is possible to prepare the sulfopolyester using, for example, a sodium sulfonate salt and later by ion-exchange replace this ion with a different ion, for example, calcium, and thus alter the characteristics of the polymer. In general, this procedure is superior to preparing the polymer with divalent salts inasmuch as the sodium salts are usually more soluble in the polymer manufacturing components than are the divalent metal salts. Polymers containing divalent and trivalent metal ions are normally less elastic and rubber-like than polymers containing monovalent ions.

The difunctional sulfomonomer contains at least one sulfonate group attached to an aromatic nucleus wherein the functional groups are hydroxy, carboxy or amino. Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Examples of sulfomonomers include sulfophthalic acid, sulfoterephthalic acid, sulfoisophthalic acid, 5-sodiosulfoisophthalic acid, 4-sulfonaphthalene-2,7- dicarboxylic acid, and their esters. Metallosulfoaryl sulfonate which is described in U.S. Pat. No. 3,779,993, and is incorporated herein by reference, may also be used as a sulfomonomer.

The sulfomonomer is present in an amount to provide water-dispersibility to the sulfopolyester. Preferably, the sulfomonomer is present in an amount of from 4 to 25 mole percent, more preferably 16 to 20 mole percent, based on the sum of the moles of total dicarboxylic acid content.

The diol component of the sulfopolyester includes cycloaliphatic diols preferably having 6 to 20 carbon atoms or aliphatic diols preferably having 3 to 20 carbon atoms. Included within the class of aliphatic diols are aliphatic diols having ether linkages such as polydiols having 4 to 800 carbon atoms. Examples of diols are: ethylene glycol, poly(ethylene glycol), propane-1,2-diol, 1,4-cyclohexanedimethanol, 2,2-dimethyl-1,3-propanediol, diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3- tetramethyl-cyclobutane, 2,2-bis-(3-hydroxyethoxyphenyl)-propane, and 2,2-bis-(4-hydroxypropoxyphenyl)-propane. The sulfopolyester may be prepared from two or more of the above diols.

The particular combination of diols is stipulated only by the requirements that the final product possess a Tg of 28° C. to 60° C. while maintaining water-dispersibility. Semi-crystalline and amorphous materials are within the scope of the present invention. It is to be understood that the sulfopolyesters of this invention contain substantially equal molar proportions of acid equivalents (100 mole %) to hydroxy equivalents (100 mole %). Thus, the sulfopolyester comprised of components (a), (b), and (c) will have a total of acid and hydroxyl equivalents equal to 200 mole percent. The sulfopolyesters have an inherent viscosity of 0.1 to 1.0 dl/g, preferably 0.30 to 0.46 dl/g.

Preferably, the sulfopolyester is derived from a mixture of dicarboxylic acids consisting of 75 to 90 mole percent isophthalic acid and 25 to 10 mole percent 5-sodio-sulfoisophthalic acid, and a diol component consisting of diethylene glycol. An equally preferred diol component consists of 45 to 85 mole percent diethylene glycol and 55 to 15 mole percent 1,4-cyclohexanedimethanol, based on 100 mole percent dicarboxylic acid and 100 mole percent diol.

Dispersal of the sulfopolyester in water is preferably done at preheated water temperature of about a 65° C. to about 95° C. and the polymer added rapidly as pellets to the vortex under high shear stirring. A Cowles Dissolver, Waring Blender, or similar equipment may be used. Once water is heated to temperature, additional heat input is not required. Depending upon the volume prepared, dispersal of the pellets by stirring should be complete within 15 to 30 min. Continued agitation with cooling may be desirable to prevent thickening at the surface due to water evaporation.

The sulfopolyesters can be prepared by conventional polycondensation procedures well-known in the art. Such processes include direct condensation of the acid with the diol or by ester interchange using lower alkyl esters. For example, a typical procedure consists of two stages. The first stage, known as ester-interchange or esterification, is conducted in an inert atmosphere at a temperature of 175° C. to 240° C. for 0.5 to 8 hours, preferably 1 to 4 hours. The diols, depending on their particular reactivities and the specific experimental conditions employed, are commonly used in molar excesses of 1.05 to 2.5 per mole of difunctional sulfomonomer.

The second stage, referred to as polycondensation, is conducted under reduced pressure at a temperature of 230° C. to 350° C., preferably 265° C. to 325° C., and more preferably 270° C. to 290° C. for 0.1 to 6 hours, preferably 0.25 to 2 hours. Because high melt viscosities are encountered in the polycondensation stage, it is sometimes advantageous to employ temperatures above 300° C. since the resulting decrease in melt viscosity allows somewhat higher molecular weights to be obtained. Stirring or appropriate conditions are employed in both stages to ensure sufficient heat transfer and surface renewal for the reaction mixture. The reactions of both stages are facilitated by appropriate catalysts which are well known in the art. Suitable catalysts include, but are not limited to, alkoxy titanium compounds, alkali metal hydroxides and alcoholates, salts of organic carboxylic acids, alkyl tin compounds and metal oxides.

Component (2) is an acrylic copolymer having repeat units from 50 to 90 weight percent vinyl acetate and 10 to 50 weight percent of a dialkyl maleate or fumerate. The dialkyl maleate or fumerate has the general formula:

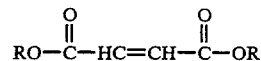

wherein R is independently a monovalent alkyl radical having 1 to 12 carbon atoms. The vinyl acetate and dialkyl maleate are polymerized in an aqueous dispersion containing the sulfopolyester (1), to form an acrylic copolymer (2). Examples of dialkyl maleates useful in the present invention include dibutyl maleate, diethyl maleate, dipropyl maleate, diisopropyl maleate and combinations thereof. Preferably, the dialkyl maleate is dibutyl maleate. It is important to note that ethylene may be substituted for the dialkyl maleate or fumerate under certain processing conditions to achieve a satisfactory sulfopolyester-acrylic blend for rendering a surface substantially impervious to alpha particle radiation.

It is preferred that the acrylic copolymer (2) be comprised of units derived from vinyl acetate present at levels at about 80 weight percent and units derived from a dialkyl maleate present at levels of about 20 weight percent. It is also preferred that the sulfopolyester-acrylic blend consist of from about 5 to about 20 weight percent of sulfopolyester (1) and from about 80 to about 95 weight percent of copolymer (2).

The acrylic copolymer can be prepared by adding vinyl acetate and dialkyl maleate to an aqueous dispersion of the water-dispersible sulfopolyester and polymerized by free radical initiation in conventional emulsion or suspension polymerization processes. The polymerization can be initiated by a water-soluble free radical initiator known in the art such as sodium persulfate or by an oil-soluble initiator such as benzoyl peroxide. Other useful initiators include non-redox initiators, such as persulfate salts, hydrogen peroxide, and organic peroxides; redox initiators, such as sodium persulfate, sodium bisulfite, sodium metabisulfite, sodium hydrosulfite, sodium thiosulfate, and sodium formaldehyde sulfoxylate. Redox initiators require an activator, such as ferrous sulfate heptahydrate, and ferrous ammonium sulfate. The preferred initiators are persulfate salts, sodium formaldehyde sulfoxylate, and ferrous sulfate heptahydrate.

Component (3) of the present invention is a plasticizer. The plasticizer is present in an amount of 0.5 to 5.0 weight percent of the composition. The plasticizer has the formula:

or

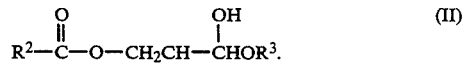

$R^1$ in Formula (I) is $CH_2CH_2OH$, $CH(OH)CH_3$, $CH(OH)CH_2OH$, or combinations thereof. $R^2$ in Formula (II) is hydrogen, an alkyl radical having 1 to 6 carbon atoms, an alkoxy radical having 1 to 6 carbon atoms, a cycloalkoxy radical having 3 to 6 carbon atoms or an aryl radical having 6 to 14 carbon atoms. $R^3$ in Formula (II) is hydrogen or

The alkyl and alkoxy radicals may be branched or straight chain. A preferred alkyl radical is methyl. Aryl radicals include phenyl, phenyl substituted with alkyl radicals, alkoxy or halogen; thienyl and furyl radicals. Preferred plasticizers include ethanol, glycerin, propylene glycol, ethylene glycol, glycerol monoacetate and glycerol diacetate.

The sulfopolyester-acrylic copolymer blends of the present invention typically become very viscous at concentrations above 30 percent solids. Thus, the reaction typically is begun with a polyester dispersion that is about 30 percent total solids or less. However, the water-dispersible polyester dispersions which are prepared by the process of the present invention can be prepared at final total solids levels up to about 65 percent. The increase in solids level is achieved during polymerization by controlling the amount of water, if any, which is added along with the vinyl acetate and dialkyl maleate. By decreasing the amount of water added during the polymerization, increasing total solids contents up to about 65 percent is possible.

Many other ingredients can be added to the sulfopolyester-acrylic copolymer blends of the present invention to enhance the performance properties of the blends. For example, talc, carbon black, aluminum powder, 2-(acetoacetoxy) ethyl methacrylate, low molecular weight polyolefin resins, preservatives, pigments, biocides, colorants, buffers, stabilizers, fillers, and the like, can be included herein. A preferred additive is carbon black in an amount of 0.5 to 5 weight percent of the blend. All of these additives and the use thereof are well known in the art. Any of these compounds can be used so long as they do not hinder the present invention from accomplishing its objects.

The sulfopolyester-acrylic blends of the present invention render surfaces such as sand, rocks and soil substantially impervious to alpha particle radiation. The blends may be applied in crawl spaces, cracks in concrete and other exposed areas under buildings which require sealing to prevent the entry of radon.

The materials and testing procedures used for the results shown herein are as follows:

Gloss white is a white ink containing about 45% titanium dioxide, about 16% of a sulfopolyester, less than one percent of TEKTAMER TM (biocide) and water.

Glass transition temperature (Tg) was determined using a differential scanning calorimeter (DSC).

Inherent viscosity (I.V.) was measured at 23° C. using 0.50 grams of polymer per 100 ml of a solvent consisting of 60% by weight phenol and 40% by weight tetrachloroethane.

Weight average molecular weight and number average molecular weight were determined by gel permeation chromatography (GPC).

The water-dispersible sulfopolyesters used in the examples are:

A. Sulfopolyester A was prepared as follows: A 500 mL round bottom flask equipped with a ground-glass head, an agitator shaft, nitrogen inlet and a side arm was charged with 74.0 grams of isophthalic acid (0,445 moles), 14.74 grams of 5-sodiosulfoisophthalic acid (0.055 moles), 81.0 grams of diethylene glycol (0.75 moles), 0.19 grams of titanium tetraisopropoxide, and 0.847 grams (0.0055 moles) of sodium acetate tetrahydrate. The flask was immersed in a Belmont bath at 200° C. for two hours under a nitrogen sweep. The temperature of the bath was increased to 280° C. and the flask was heated for one hour under reduced pressure of 0.5 to 0.1 mm of Hg. The flask was allowed to cool to room temperature and the sulfopolyester was removed from the flask. The sulfopolyester had an I.V. of 0.45 and a glass transition temperature of 29° C. The sulfopolyester was extruded and pelletized.

A 28% solids dispersion of Sulfopolyester A in water was prepared by heating the water to a temperature of 75° C. to 85° C. and adding the required amount of pellets while agitating at a rate sufficient to maintain the pellets in suspension. The heating was continued until all the pellets were dispersed, approximately, 20 to 30 minutes. Water was added to replace evaporation loss. The dispersion was cooled and filtered.

B. Sulfopolyester B was prepared as follows: A 500 mL round bottom flask equipped with a ground-glass head, an agitator shaft, nitrogen inlet and a side arm was charged with 74.0 grams of isophthalic acid, 16.0 grams of 5-sodiosulfoisophthalic acid, 83.0 grams of diethylene glycol, 16.0 grams of 1,4-cyclohexanedimethanol, sufficient titanium isopropoxide to provide 50 ppm of titanium, and 0.45 grams of sodium acetate tetrahydrate. The flask was immersed in a Belmont bath at 200° C. for one hour under a nitrogen sweep. The temperature of the bath was increased to 230° C. for one hour. The temperature of the bath was increased to 280° C. and the flask was heated for 45 minutes under reduced pressure of 0.5 to 0.1 mm of Hg. The flask was allowed to cool to room temperature and the copolyester was removed from the flask. The sulfopolyester had an I.V. of 0.36 and a glass transition temperature of 38° C. The sulfopolyester was extruded and pelletized.

A 28% solids dispersion of Sulfopolyester B in water was prepared by heating the water to a temperature of 90° C. to 95° C. and adding the required amount of pellets while agitating at a rate sufficient to maintain the pellets in suspension. The heating was continued until all the pellets were dispersed, approximately, 20 to 30 minutes. Water was added to replace evaporation loss. The dispersion was cooled and filtered.

C. Sulfopolyester C was prepared as follows: A 500 mL round bottom flask equipped with a ground-glass head, an agitator shaft, nitrogen inlet and a side arm was charged with 136.0 grams of isophthalic acid, 53.0 grams of 5-sodiosulfoisophthalic acid, 155.0 grams of diethylene glycol, 78.0 grams of 1,4-cyclohexanedimethanol, sufficient titanium isopropoxide to provide 50 ppm of titanium, and 1.48 grams of sodium acetate tetrahydrate. The flask was immersed in a Belmont bath at 200° C. for one hour under a nitrogen sweep. The temperature of the bath was increased to 230° C. for one hour. The temperature of the bath was increased to 280° C. and the flask was heated for 45 minutes under reduced pressure of 0.5 to 0.1 mm of Hg. The flask was allowed to cool to room temperature and the sulfopolyester was removed from the flask. The sulfopolyester had an I.V. of 0.33 and a glass transition temperature of 55° C. The sulfopolyester was extruded and pelletized.

A 28% solids dispersion of Sulfopolyester C in water was prepared by heating the water to a temperature of 85° C. to 90° C. and adding the required amount of pellets while agitating at a rate sufficient to maintain the pellets in suspension. The heating was continued until all the pellets were dispersed, approximately, 20 to 30 minutes. Water was added to replace evaporation loss. The dispersion was cooled and filtered.

The composition of Sulfopolyesters A, B and C are summarized as follows:

| Sulfo-polyester | IPA Mole % | SIP Mole % | DEG Mole % | CHDM Mole % | I.V. | Tg |
|---|---|---|---|---|---|---|
| A | 89 | 11 | 100 | 0 | .45 | 29 |
| B | 89 | 11 | 78 | 22 | .36 | 38 |
| C | 82 | 18 | 34 | 46 | .33 | 55 |

The process of the present invention will be further illustrated by a consideration of the following examples, which are intended to be exemplary of the invention. All parts and percentages in the examples are on a weight basis unless otherwise stated.

EXAMPLE 1

Sulfopolyester A, 856.0 grams, was added with constant stirring to 1384.0 grams of water which contained 6.0 grams of ammonium persulfate dissolved therein. The mixture was heated to 70° C. Vinyl acetate, 1400.0 grams and 360.0 grams of dibutyl maleate were added over a period of three hours while agitation was applied. After addition, the temperature and agitation were maintained for four hours. The mixture was cooled to room temperature. The pH was adjusted to 5.0–5.5 by the addition of concentrated ammonium hydroxide. The sulfopolyester-acrylic blend was filtered through a 53 μm mesh nylon filter.

The polymer blend had a weight average molecular weight of 58,998 and a number average molecular weight of 8,095. The solids content was 50% by weight. The sulfopolyester-acrylic blend consisted of about 12% by weight of sulfopolyester and 88% by weight of an acrylic copolymer containing 70% by weight of vinyl acetate and 18% by weight of dibutyl maleate.

EXAMPLE 2

Glycerol monoacetate, 2 weight percent, was added to the sulfopolyester-acrylic polymer blend prepared in Example 1. The composition was sprayed onto glass and formed a film. The film (6 millimeters thick) was very flexible and tough. A section of the film, approximately one inch square, was placed in 10 milliliters of distilled water for 24 hours. The water had no apparent effect on the film.

EXAMPLE 3

Glycerin, 2 weight percent, was added to the sulfopolyester-acrylic polymer blend prepared in Example 1. The composition was sprayed onto glass and formed a film. The film (6 millimeters thick) was very flexible and tough. A section of the film, approximately one inch square, was placed in 10 milliliters of distilled water for 24 hours. The film disintegrated.

EXAMPLE 4

Glycerol diacetate, 2 weight percent, was added to the sulfopolyester-acrylic polymer blend prepared in Example 1. The composition was sprayed onto glass and formed a film. The film (6 millimeters thick) was very flexible and tough. A section of the film, approximately one inch square, was placed in 10 milliliters of distilled water for 24 hours. The water had no apparent effect on the film.

EXAMPLE 5

Glycerol monoacetate, 5 weight percent, was added to the sulfopolyester-acrylic polymer blend prepared in Example 1. The composition was sprayed onto glass and formed a film. The film (6 millimeters thick) was very flexible and tough. A section of the film, approximately one inch square, was placed in 10 milliliters of distilled water for 24 hours. The water had no apparent effect on the film.

EXAMPLE 6

Glycerol monoacetate, 5 weight percent, was added to the sulfopolyester-acrylic polymer blend prepared in Example 1. The composition was sprayed onto glass and formed a film. The film (6 millimeters thick) was very flexible and tough. A section of the film, approximately one inch square, was placed in 10 milliliters of distilled water for 24 hours. The water had no apparent effect on the film.

EXAMPLE 7

Glycerol monoacetate, 0.5 weight percent, was added to the sulfopolyester-acrylic polymer blend prepared in Example 1. The composition was sprayed onto glass and formed a film. The film (6 millimeters thick) was somewhat flexible and tough. A section of the film, approximately one inch square, was placed in 10 milliliters of distilled water for 24 hours. The water had no apparent effect on the film.

EXAMPLE 8

Glycerol diacetate, 0.5 weight percent, was added to the sulfopolyester-acrylic polymer blend prepared in Example 1. The composition was sprayed onto glass and formed a film. The film (6 millimeters thick) was somewhat flexible and tough. A section of the film, approximately one inch square, was placed in 10 milliliters of distilled water for 24 hours. The water had no apparent effect on the film.

EXAMPLE 9

Propylene glycol, 2 weight percent, was added to the sulfopolyester-acrylic polymer blend prepared in Example 1. The composition was sprayed on soil that was enclosed in a 5-gallon plastic bucket. Prior to spraying, the air in the bucket contained an average of 31.3 radon picoCuries per liter of air (pCi/L). During a 14 day period after spraying, the air contained an average of 3.9 pCi/L radon per liter of air. This was a reduction of 87.5%.

EXAMPLE 10

2-(acetoacetoxy) ethyl methacrylate, 5 weight percent and 3 weight percent of talc were added to the sulfopolyester-acrylic polymer blend prepared in Example 1. The composition was sprayed on soil that was enclosed in a 5-gallon plastic bucket. Prior to spraying, the air in the bucket contained an average of 33 radon picoCuries per liter of air (pCi/L). During a 14 day period after spraying, the air contained an average of 8.1 pCi/L radon per liter of air. This was a reduction of 33%.

EXAMPLE 11

Propylene glycol, 2 weight percent and 2 weight percent of aluminum powder were added to the sulfopolyester-acrylic polymer blend prepared in Example 1. The composition was sprayed onto glass and formed a film. The film (6 millimeters thick) was taped over a 2⅛" hole separating a 5-gallon air chamber from 4 kilograms of soil. Prior to sealing the hole with the film, the air in the bucket contained an average of 11.1 radon picoCuries per liter of air (pCi/L). During a 7 day period after sealing, the air contained an average of 0.55 pCi/L radon per liter of air. This was a reduction of 95%.

EXAMPLE 12

Propylene glycol, 0.5 weight percent was added to the sulfopolyester-acrylic polymer blend prepared in Example 1. The composition was sprayed onto glass and formed a film. The film (6 millimeters thick) was taped over a 2⅛" hole separating a 5-gallon air chamber from 4 kilograms of soil. Prior to sealing the hole with the film, the air in the bucket contained an average of 11.9 radon picoCuries per liter of air (pCi/L). During a 7 day period after sealing, the air contained an average of 1.0 pCi/L radon per liter of air. This was a reduction of 91.7%.

EXAMPLE 13

Acetoacetoxyethylmethacrylate, 5 weight percent, and 1 weight percent talc were added to the sulfopolyester-acrylic polymer blend prepared in Example 1. The composition was sprayed onto glass and formed a film. The film (6 millimeters thick) was taped over a 2⅛" hole separating a 5-gallon air chamber from 4 kilograms of soil. Prior to sealing the hole with the film, the air in the bucket contained an average of 11.0 radon picoCuries per liter of air (pCi/L). During a 48 day period after sealing, the air contained an average of 3.52 pCi/L radon per liter of air. This was a reduction of 68%.

EXAMPLE 14

Propylene glycol, 2.0 weight percent was added to the sulfopolyester-acrylic polymer blend prepared in Example 1. The composition was sprayed onto a cinderblock of the type used in foundations and basement construction. The film dried rapidly and sealed the surface of the block against penetration by air containing radon or other undesirable gases and/or mold spores.

EXAMPLE 15

Propylene glycol, 2 weight percent, and 3 weight percent carbon black were added to the sulfopolyester-acrylic polymer blend prepared in Example 1. The composition was sprayed onto glass and formed a film. The film (9 millimeters thick) was taped over a 2⅛" hole separating a 5-gallon air chamber from 4 kilograms of soil. Prior to sealing the hole with the film, the air in the bucket contained an average of 9.4 radon picoCuries per liter of air (pCi/L). During a 41 day period after sealing, the air contained an average of 0 pCi/L radon per liter of air. This was a reduction of 100%.

EXAMPLE 16

Glycerol monoacetate, 2 weight percent, and 3 weight percent of a water dispersed polyolefin resin were added to the sulfopolyester-acrylic polymer blend prepared in Example 1. The composition was sprayed onto glass and formed a film. The film (9 millimeters thick) was taped over a 2⅛" hole separating a 5-gallon air chamber from 4 kilograms of soil. Prior to sealing the hole with the film, the air in the bucket contained an average of 9.4 radon picoCuries per liter of air (pCi/L). During a 14 day period after sealing, the air contained an average of 0.94 pCi/L radon per liter of air. This was a reduction of 90%.

EXAMPLE 17

Glycerol monoacetate, 2 weight percent, and 3 weight percent carbon black were added to the sulfopolyester-acrylic polymer blend prepared in Example 1. The composition was sprayed onto glass and formed a film. The film (9 millimeters thick) was taped over a 2⅛" hole separating a 5-gallon air chamber from 4 kilograms of soil. Prior to sealing the hole with the film, the air in the bucket contained an average of 9.4 radon picoCuries per liter of air (pCi/L). During a 40 day period after sealing, the air contained an average of 0 pCi/L radon per liter of air. This was a reduction of 100%.

EXAMPLE 18

Glycerol monoacetate, 2 weight percent, and 3 weight percent of a water dispersed polyolefin resin were added to the sulfopolyester-acrylic polymer blend prepared in Example 1. The composition was sprayed onto glass and formed a film. The film (9 millimeters thick) was taped over a 2⅛" hole separating a 5-gallon air chamber from 4 kilograms of soil. Prior to sealing the hole with the film, the air in the bucket contained an average of 9.4 radon picoCuries per liter of air (pCi/L). During a 14 day period after sealing, the air contained an average of 0.94 pCi/L radon per liter of air. This was a reduction of 90%.

EXAMPLE 19

Sulfopolyester B, 856.0 grams, was added with constant stirring to 1384.0 grams of water which contained 6.0 grams of ammonium persulfate dissolved therein. The mixture was heated to 70° C. Vinyl acetate, 1400.0 grams and 360.0 grams of dibutyl maleate were added over a period of three hours while agitation was applied. After addition, the temperature and agitation were maintained for four hours. The mixture was cooled to room temperature. The pH was adjusted to 5.0–5.5 by the addition of concentrated ammonium hydroxide. The sulfopolyester-acrylic blend was filtered through a 53 μm mesh nylon filter.

EXAMPLE 20

Propylene glycol, 2 weight percent and 2 weight percent of gloss white were added to the sulfopolyester-acrylic polymer blend prepared in Example 19. The composition was sprayed onto glass and formed a film. The film (6 millimeters thick) was taped over a 2⅛" hole separating a 5-gallon air chamber from 4 kilograms of soil. Prior to sealing the hole with the film, the air in the bucket contained an average of 11.1 radon picoCuries per liter of air (pCi/L). During a 14 day period after sealing, the air contained an average of 2.5 pCi/L radon per liter of air. This was a reduction of 77%.

EXAMPLE 21

Sulfopolyester A, 428 grams, and 428 grams of Sulfopolyester C were added with constant stirring to 1384.0 grams of water which contained 6.0 grams of ammonium persulfate dissolved therein. The mixture was heated to 70° C. The temperature and agitation were maintained for four hours. The mixture was cooled to room temperature. The pH was adjusted to 5.0–5.5 by the addition of concentrated ammonium hydroxide. The sulfopolyester-acrylic blend was filtered through a 53 μm mesh nylon filter.

EXAMPLE 22

Propylene glycol, 2 weight percent and 4 weight percent of gloss white were added to the sulfopolyester-acrylic polymer blend prepared in Example 21. The composition was sprayed onto glass and formed a film. The film (15 millimeters thick) was taped over a 2⅛" hole separating a 5-gallon air chamber from 4 kilograms of soil. Prior to sealing the hole with the film, the air in the bucket contained an average of 10.9 radon picoCuries per liter of air (pCi/L). During a 21 day period after sealing, the air contained an average of 0.51 pCi/L radon per liter of air. This was a reduction of 95.3%.

EXAMPLE 23

An isoprene rubber emulsion known commercially as RADOX TM was sprayed onto glass and formed a film. The film (6 millimeters thick) was taped over a 2⅛" hole separating a 5-gallon air chamber from 4 kilograms of soil. Prior to sealing the hole with the film, the air in the bucket contained an average of 9.4 radon picoCuries per liter of air (pCi/L). During a 7 day period after sealing, the air contained an average of 3.3 pCi/L radon per liter of air. This was a reduction of 65%.

A noted disadvantage of using RADOX TM is that irritating fumes are released when the film is prepared. Moreover, the RADOX TM film showed signs of disintegration after 30 days in contact with soil.

EXAMPLE 24

A commercially available polyethylene film (6 millimeters thick) was taped over a 2⅛" hole separating a 5-gallon air chamber from 4 kilograms of soil. Prior to sealing the hole with the film, the air in the bucket contained an average of 11.0 radon picoCuries per liter of air (pCi/L). During a 7 day period after sealing, the air contained an average of 3.74 pCi/L radon per liter of air. This was a reduction of 66%.

EXAMPLE 25

The sulfopolyester-acrylic polymer blend prepared in Example 1 was sprayed onto glass and formed a film. The film, however, was very brittle and could not be tested.

Many variations will suggest themselves to those skilled in this art in light of the above detailed description. All such obvious modifications are within the full intended scope of the appended claims.

What is claimed is:

1. A method for rendering a surface substantially impervious to alpha particle radiation comprising applying to said surface a sulfopolyester-acrylic copolymer blend comprising:
   (1) at least one sulfopolyester consisting essentially of repeat units from
   (a) a dicarboxylic acid selected from the group consisting of terephthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and combinations thereof;
   (b) a diol; and
   (c) a difunctional sulfomonomer containing at least one sulfonate group attached to an aromatic nucleus wherein the functional groups are hydroxy, carboxy or amino, provided the difunctional sulfomonomer is present in an amount from 12 to 25 mole percent based on 100 mole percent dicarboxylic acid and 100 mole percent diol; and
   (2) an acrylic copolymer having repeat units from 50 to 90 weight percent vinyl acetate and 10 to 50 weight percent of a dialkyl maleate having the formula

which is polymerized in an aqueous dispersion of the sulfopolyester; wherein R is independently a monovalent alkyl radical having 1 to 12 carbon atoms; and
   (3) 0.5 to 5.0 weight percent of a plasticizer of the formula:

$$HOCH_2R^1 \quad (I)$$

or

wherein $R^1$ is selected from the group consisting of $CH_2CH_2OH$, $CH(OH)CH_3$, and $CH(OH)CH_2OH$; $R^2$ is selected from the group consisting of hydrogen, an alkyl radical having 1 to 6 carbon atoms, an alkoxy radical having 1 to 6 carbon atoms, a cycloalkoxy radical having 3 to 6 carbon atoms and an aryl radical having 6 to 14 carbon atoms; and $R^3$ is selected from the group consisting of hydrogen and

2. A method for rendering a surface substantially impervious to alpha particle radiation comprising applying to said surface a sulfopolyester-acrylic copolymer blend comprising:
   (1) at least one sulfopolyester consisting essentially of repeat units from
   (a) a dicarboxylic acid selected from the group consisting of terephthalic acid, phthalic acid, isophthalic acid, naphthalene-2,6-dicarboxylic acid, cyclohexanedicarboxylic acid, cyclohexanediacetic acid, and combinations thereof;
   (b) a diol selected from the group consisting of ethylene glycol, diethylene glycol, triethylene glycol, 1,4-cyclohexanedimethanol, and combinations thereof; and
   (c) a difunctional sulfomonomer selected from the group consisting of sulfophthalic acid, sulfoterephthalic acid, sulfoisophthalic acid, 4-sulfonaphthalene-2,7-dicarboxylic acid, and esters thereof, provided the difunctional sulfomonomer is present in an amount from 4 to 25 mole percent based on 100 mole percent dicarboxylic acid and 100 mole percent diol; and (2) an acrylic copolymer having repeat units from 50 to 90 weight percent vinyl acetate and 10 to 50 weight percent of a dialkyl maleate having the formula

which is polymerized in an aqueous dispersion of the sulfopolyester; wherein R is a monovalent alkyl radical having 1 to 12 carbon atoms; and (3) 0.5 to 5.0 weight percent of a plasticizer selected from the group consisting of ethanol, glycerin, propylene glycol, ethylene glycol, glycerol monoacetate, glycerol diacetate and combinations thereof.

3. The method of claim 1 wherein the diol component of the sulfopolyester is selected from the group consisting of ethylene glycol, diethylene glycol, triethylene glycol, 1,4-cyclohexanedimethanol, and mixtures thereof.

4. The method of claim 3 wherein the diol component is a mixture of diethylene-glycol and 1,4-cyclohexanedimethanol.

5. The method of claim 1 wherein the difunctional sulfomonomer component of the sulfopolyester is selected from the group consisting of sulfophthalic acid, sulfoterephthalic acid, sulfoisophthalic acid, 4-sulfonaphthalene-2,7-dicarboxylic acid, and esters thereof.

6. The method of claim 5 wherein the difunctional sulfomonomer is 5-sodio-sulfoisophthalic acid.

7. The method of claim 2 wherein the difunctional sulfomonomer is 5-sodio-sulfoisophthalic acid.

8. The method of claim 1 wherein each of the sulfopolyesters has a glass transition temperature of 28° C. to 60° C.

9. The method of claim 1 wherein each of the sulfopolyesters has an inherent viscosity of 0.1 to 1.0 dl/gm.

10. The method of claim 9 wherein each of the sulfopolyesters has an inherent viscosity of 0.30 to 0.46 dl/gm.

11. The method of claim 1 wherein the dialkyl maleate is selected from the group consisting of dibutyl maleate, diethyl maleate, dipropyl maleate, diisopropyl maleate and combinations thereof.

12. The method of claim 1 wherein the acrylic copolymer is comprised of units derived from 70 to 90 weight percent vinyl acetate and 30 to 10 weight percent of a dialkyl maleate.

13. The method of claim 1 wherein the sulfopolyester and the acrylic copolymer are present in an amount of from 5 to 20 and 95 to 80 weight percent respectively.

14. The method of claim 1 wherein the sulfopolyester is derived from a mixture of dicarboxylic acids consisting of 75 to 90 mole percent isophthalic acid and 25 to 10 mole percent 5-sodio-sulfoisophthalic acid, and a diol component consisting of diethylene glycol.

15. The method of claim 1 wherein the sulfopolyester is derived from a mixture of dicarboxylic acids consisting of 75 to 90 mole percent isophthalic acid and 25 to 10 mole percent 5-sodio-sulfoisophthalic acid, and a diol component consisting of 45 to 85 mole percent diethylene glycol and 55 to 15 mole percent 1,4-cyclohexanedimethanol.

16. The method of claim 1 which additionally contains an additive selected from the group consisting of talc, carbon black, aluminum powder, 2-(acetoacetoxy) ethyl methacrylate, low molecular weight polyolefin resins, preservatives, pigments, biocides, colorants, buffers, stabilizers, fillers, and the like.

17. The method of claim 15 wherein the additive is carbon black.

18. The method of claim 17 wherein the carbon black is added in an amount of 0.5 to 5.0 weight percent of the total sulfopolyester-acrylic copolymer blend.

* * * * *